Sept. 24, 1940.  E. A. SPERRY, JR  2,215,622
MAGNETIC COMPASS
Filed July 30, 1936  3 Sheets-Sheet 3

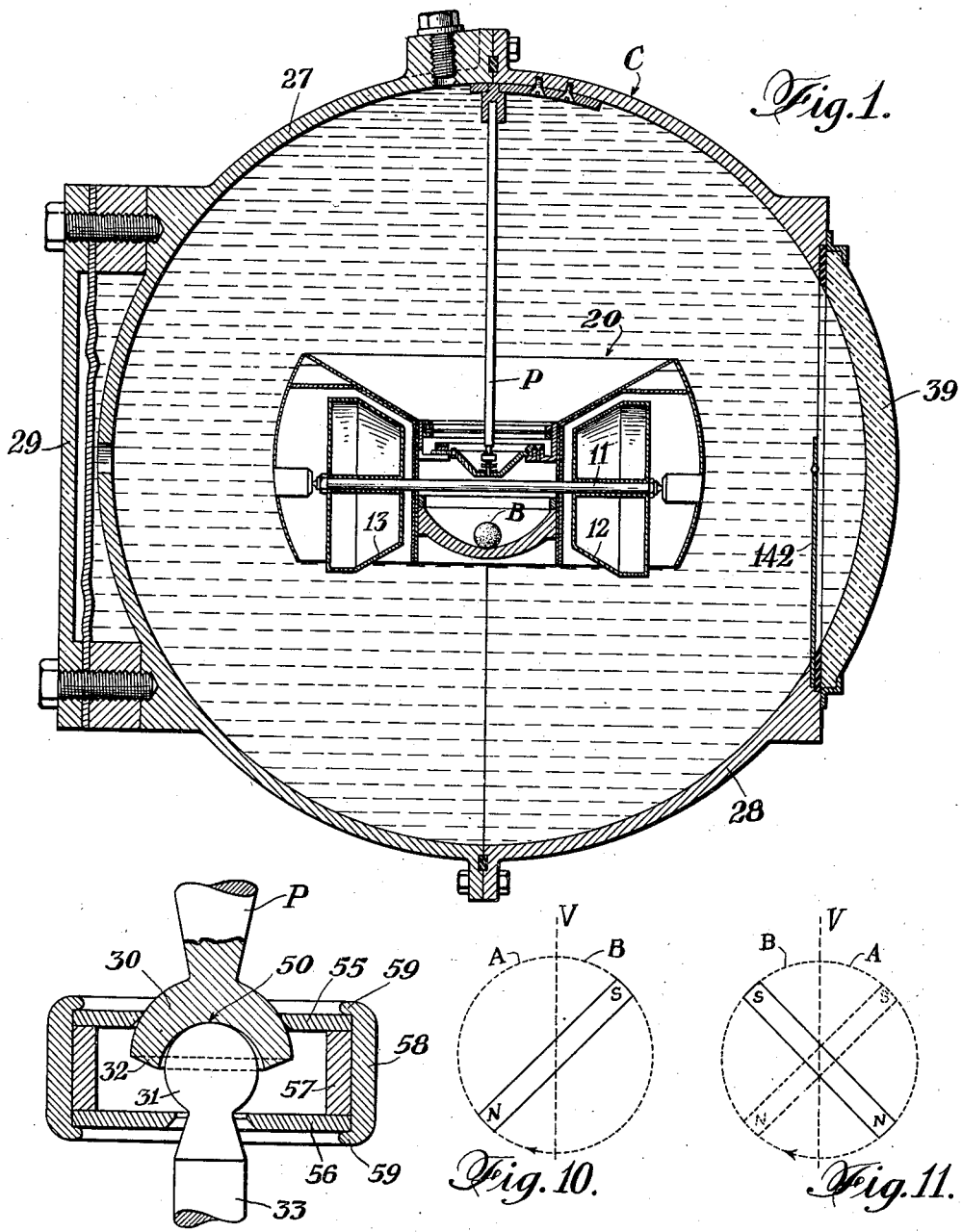

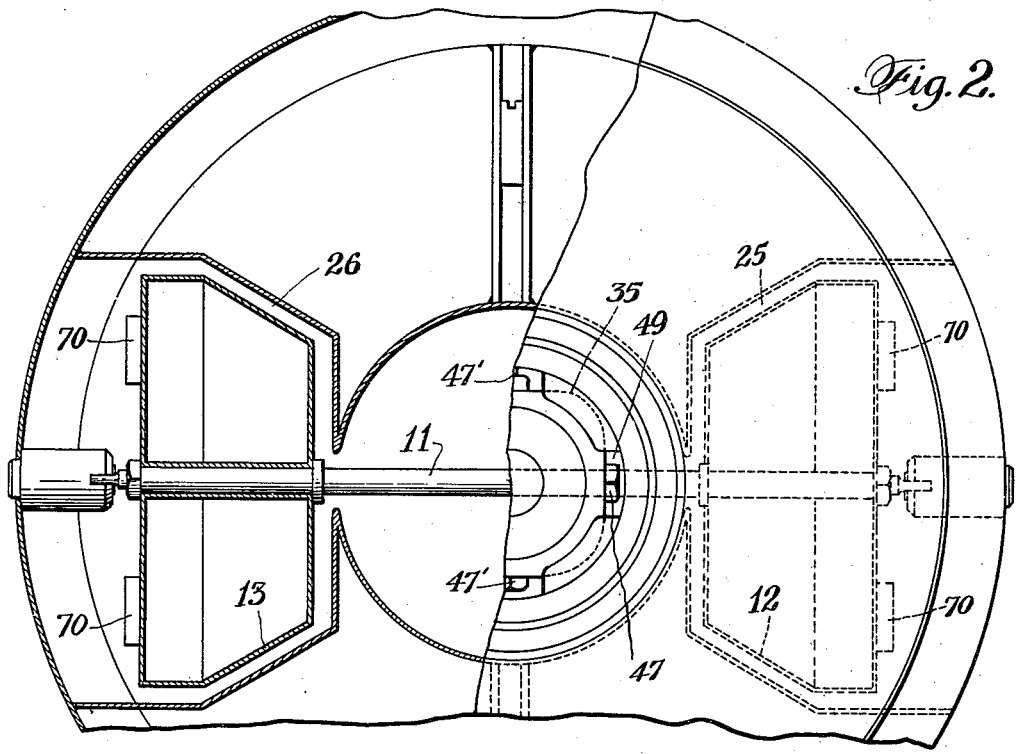
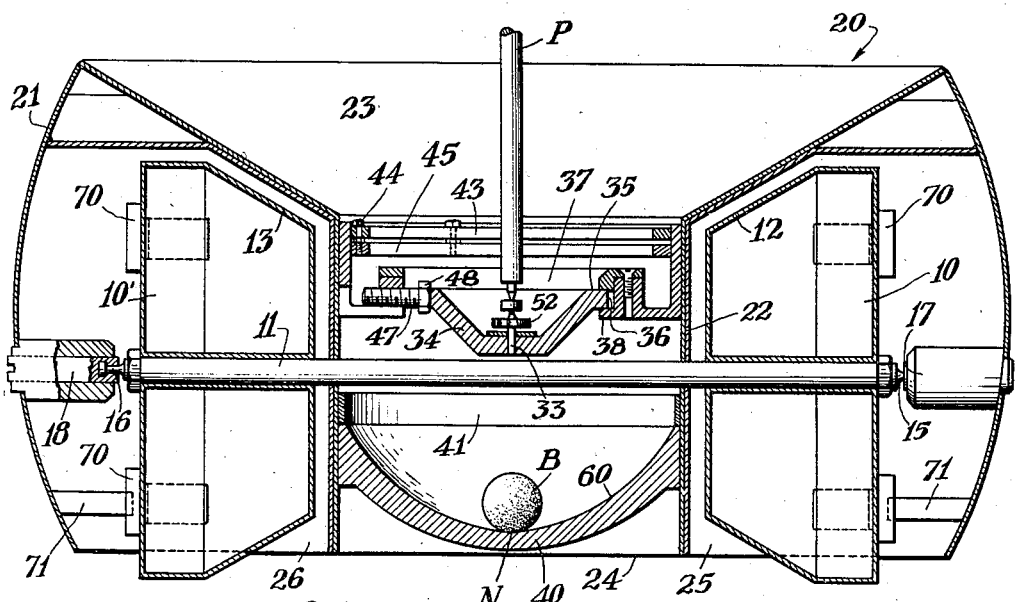

INVENTOR
*Elmer A. Sperry, Jr.*
BY
*Joseph H. Lipschutz*
ATTORNEY

Patented Sept. 24, 1940

2,215,622

UNITED STATES PATENT OFFICE 2,215,622

MAGNETIC COMPASS

Elmer A. Sperry, Jr., Brooklyn, N. Y., assignor to Sperry Products, Inc., Brooklyn, N. Y., a corporation of New York Application July 30, 1936, Serial No. 93,319

7 Claims. (Cl. 33—222)

This invention relates to a magnetic compass which, because of its characteristics, may also be utilized on aircraft as a universal flight instrument designed not merely to give improved magnetic compass bearings but also to inform the pilot of direction and attitude of flight. In other words, this magnetic compass, because of its inherent characteristics, performs the functions not only of a magnetic compass but also of an artificial horizon, directional gyro, and inclinometer.

It is well known that the standard magnetic compass cannot be used by the pilot of an airplane for the purpose of flying a straight course or making turns without the aid of other instruments or visual ground references. This is due primarily to two factors, first, the magnetic dip of the magnets is overcome in the standard magnetic compasses by counterweighting one end of the magnet. This gives rise to a gravitational unbalance which renders the heavy end of the needle responsive to acceleration forces. Secondly, the magnetic element must be made pendulous if it is to give a useful indication. This is due to the fact that the magnetic element must give an indication of direction in azimuth and unless the magnetic element is stabilized in a horizontal plane so that its movements take place in substantially said plane, no useful indication would be given by the magnets. The reason for this is that the magnets, if non-pendulous and therefore unstabilized in a horizontal plane, are free to rotate about the axis through the N-S poles. Making the magnetic element pendulous, however, renders this element responsive to every change in speed and direction, giving rise to large errors, sometimes in excess of 180°. Some magnetic compasses, in practice, are made excessively pendulous in order to avoid the necessity of applying counterweights to counteract the dip, but such compasses are subject to the same errors due to change of speed or direction.

The problem consists in introducing in a magnetic compass the necessary pendulous factor so that the said compass may indicate direction in azimuth, and at the same time free the magnetic compass from errors of such magnitude as will render it useless upon changes of speed or turning of the craft upon which it is mounted. Applicant accomplishes this desirable result by so mounting a pendulous element on the magnetic element that the disturbing torques which the pendulous element applies to the magnetic element in response to acceleration forces are substantially less than the disturbing torques which would be applied by the said pendulous element if it were rigidly connected to the magnetic element.

Further objects and advantages of this invention will become apparent in the following detailed description.

In the accompanying drawings,

Fig. 1 is a vertical section through a compass embodying one form of my invention.

Fig. 2 is a plan view of the sensitive element of the Fig. 1 device, with parts of the casing broken away to disclose the underlying mechanism.

Fig. 3 is a vertical section through the sensitive element comprising the magnetic element and the pendulous element.

Fig. 4 is a detail of the pivot post whereby the sensitive element is mounted.

Figure 6:
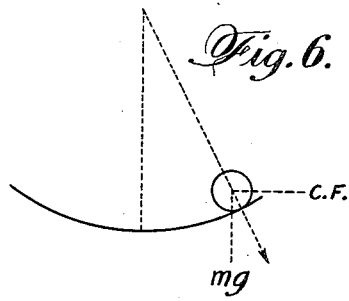

Figs. 5 to 9 inclusive are diagrams illustrating the underlying theory of my invention.

Figs. 10 and 11 are diagrams illustrating a theory of operation of this invention.

Referring to the drawings, it will be seen that I have disclosed a type of compass which is free of the defects present in all previous forms of magnetic compass and enables the pilot to fly in any direction and to turn, always directing himself solely by the compass and not relying upon other instruments.

To accomplish the above, I have provided a sensitive element which comprises essentially three parts, first, a magnetic or meridian-seeking element, second, a pendulous element, and, third, means for supporting the pendulous element on the magnetic element.

The magnetic element may consist of a magnet system and a card element upon which said system is mounted. The magnet system may comprise a pair of magnets 10, 10' connected to the shaft 11, so that said shaft is constrained to move with said magnets as the latter change their dip or inclination. The magnets 10, 10' may take the form of magnetized hollow, circular, closed chambers. The said shaft 11 is mounted for rotation about its axis on pivots 15, 16, journaled in bearings 17 and 18, respectively, said bearings being carried by the card element which may comprise a float chamber 20. The said float chamber consists of an outer wall 21, an inner cylindrical wall 22, a top 23 and a bottom 24. The float chamber is adapted to be enclosed in a spherical container and in order to obtain the maximum buoyancy of the float chamber with a given clearance between the float chamber and the spherical container, the outer wall 21 is made convex. The increased buoyancy enables the float chamber to be made of thicker material which yields a stronger construction and one which withstands temperature changes better than a thinner wall. The convex outer wall also results in a larger moment of inertia. The inner cylindrical wall 22 forms a hollow center for the float chamber 20 within which is adapted to be mounted the supporting mechanism. The said inner cylindrical wall 22 is preferably of lesser height than the outer wall 21, so that the top wall 23 forms a truncated cone. The float chamber 20 is completely closed except for cavities 25 and 26 (see Fig. 2) in which the magnet float chambers 10 and 10' operate.

The magnetic element, as thus far described, is a buoyant member which is designed to be placed in a container C filled with fluid. Said container may take the form of a spherical container consisting of a plurality of parts 27, 28, the part 27 communicating with an expansion chamber 29 to take up variations in the volume of the liquid due to temperature changes, and the part 28 having a window 39 in the front thereof through which the compass readings may be taken. The magnetic element being buoyant, this fact is taken advantage of to support said element against a downwardly extending pivotal bearing 30 at the lower end of a pivot post P fixed in the casing C. For this purpose, the magnetic element is provided with a pivot 31 bearing against a cup 32 formed in pivotal bearing 30. The pivot 31 may take the form of a spherical jewel or metallic member, such as platinum-irridium alloy, operating in cup bearing 32 which is of slightly greater diameter than pivot 31 so that the pivot 31 is internally tangential to cup 32 at substantially a point 50. The said pivot 31 may be formed on the upper end of a post 33 screw-threaded at its lower end into a plate 34 having flanged portion 35 which is supported for movement in a horizontal plane within circumferential groove 36 formed by upper and lower rings 37 and 38 fixedly supported on the inner wall 22 of the float chamber 20. The buoyancy of the float chamber 20 and the mechanism supported thereby is such that the said chamber 20 and all the mechanism supported thereby will be held upwardly in engagement with cup 32 of pivot post P.

The said pivotal connection between pivot 31 and bearing 30 may be enclosed within a retaining casing freely mounted on the bearing cup and comprising upper and lower members 55, 56, surrounding the bearing member 30 and the bearing post 31, respectively, and spaced by spaced member 57. The members 55 and 56 have openings therein large enough to permit wide angle movement of the sensitive element with respect to post P. Said members 55, 56, and 57 may be held in position by means of cylindrical member 58 having turned edges 59. There is thus formed an enclosing casing for the bearing members 30, 31 which will act to retain the sensitive element in position with pivot 31 in engagement with cup 32 and counteract any tendency for the sensitive element to leave its bearing in response to jars, vibration, and the like. The said retaining casing is freely mounted on the said bearing members so as not to interfere with the relative angular movements of post 33 with respect to post P.

From the above description it will be apparent that I am enabled to obtain a maximum relative angular movement of the sensitive element with respect to pivot post P without disengagement of the parts. This is due to the fact that the pivot 31 is as nearly a complete sphere as is possible, only a minimum portion thereof being utilized for connection to the post 33. The inner surface 32 of cup 30 fits the bearing 31 rather closely and extends down less than half the diameter of the sphere, so that a maximum movement of the sensitive element with respect to the said pivot post P of almost 60° to either side is made possible. This is in contradistinction to the standard form of magnetic compass where a needle point engages in the shallow cup and after a maximum of 20° displacement the needle slides in the cup and may become completely disconnected. Any tendency of pivot 31 to be dislodged from bearing cup 30 is counteracted by the retaining casing which, however, because of its loose mounting, does not interfere with the relative angular movements of the sensitive element with respect to the pivot post P.

It will now be seen that by the construction thus far described, the magnets 10, 10' are free to assume their natural angle of dip by reason of the fact that they are carried by axle 11 in fixed relation to said axle which is free to rotate about its axis in bearings 17, 18. It is also apparent that the sensitive element as a whole may rotate around a vertical axis through the pivot and bearing. Under these circumstances the magnets have two stable positions with respect to the sensitive element. Ordinarily, the north end of each magnet operates in a vertical semicircle indicated at A in Fig. 10, as the compass travels from the north to the south pole, and the markings on the surface 21 can be read through window 39 in conjunction with lubber line 142. Thus, if the craft is travelling north, the letter N on the card element will be seen through window 39. However, if the sensitive element should for some reason become turned through 180°, then the semi-circle A takes up the position shown in Fig. 11. This is an unstable position for the magnets, since the north end is pointing south, and the north end of each magnet, therefore, tends to travel by the shortest route, indicated by the arrow, to the dotted line position where the north end again points north. That is to say, the north end of the magnet tends to swing around the axis 15—16 through the vertical plane into the semi-circle B. Since the north end of each magnet is now pointing north again, this is a stable position, even though the sensitive element and the compass markings are turned through 180°. In other words, if the craft continues to travel north, the south marking on wall 21 will be seen through window 39. The readings are thus 180° in error. To prevent such error from arising, I provide means for confining the north end of the magnet to semi-circle A and the south end to semi-circle B by preventing passage of the ends of the magnets through the vertical line indicated at V which is in reality a vertical plane passed through the dip axis 11 of the magnets. In other words, the north end cannot, in Fig. 10, travel the course indicated by the arrow into the semi-circle B. For this purpose I provide on the float chamber 20 within the cavities 25, 26 in which the magnets operate, a stop 71 in each of said cavities, which stop is so positioned that it will engage one of a set of lugs 70 carried by each magnet float chamber 10 and 10'. The stops and lugs are so positioned that the stops will engage one or the other of the lugs of each set before the end of the magnet can pass through the said vertical plane through the pivotal axis of the magnets. Therefore, should the sensitive element become turned through 180°, there is no way by which the north end of the magnets can again indicate north except by turning through 180° in azimuth and necessarily carrying the sensitive element through 180° in azimuth to its original settling position.

Thus the sensitive element is freed of the first of the two objectionable features present in ordinary magnetic compasses, namely, the gravitational instability which is caused by placing weights on one arm of the pivoted magnet in order to bring said magnet into the horizontal position, and therefore there is avoided the error which present magnetic compasses are subject to by reason of the action of acceleration forces on the offset weight.

As stated hereinbefore, it is necessary that any magnetic meridian seeking element be stabilized in the horizontal plane, and this is effected by rendering the same pendulous. The pendulous element here employed consists of a ball B which is supported on the magnetic element by a circular cup 40 which is fixed in position on inner wall 22 so as to close the lower end of the hollow center formed in float chamber 20. The said cup 40 may be fixed in position in said hollow interior by means of ring 41. The ball B operates on the surface 60 of cup 40 and imparts the necessary pendulosity to the entire sensitive element so that it is stabilized in a horizontal plane. However, the buoyancy of the sensitive element as a whole including the pendulous element B is still such that it exceeds the weight of the displaced fluid, and therefore the sensitive element will be held against the cup 32 at the end of pivot post P. However, the buoyancy is such that the sensitive element will touch the point of tangency 50 in the said cup 32 with a pressure which is the minimum necessary to ensure engagement so that pivot friction is reduced to a minimum.

It is essential for the proper operation of this type compass that the center of gravity and center of buoyancy of the magnetic element and cup 40 shall coincide with the center of pivot 31. For this purpose the adjusting screw 18 may be utilized, the said screw supporting the journal portion 16 carried by shaft 11. This, however, shifts the center of gravity only in one of three essential directions, and for the other direction in the horizontal plane small masses of metal may be placed upon the outside wall 21 to effect the necessary balance, and if desired such masses of metal may be used in the direction of axis 11 also. In the third direction, the center of gravity is adjusted by means of a ring 43 which may be operated vertically by a plurality of adjusting screws 44 extending through said ring and threaded into grooves in a ring 45 fixed to the inner wall 22. When the float chamber 20 with all of the elements supported thereby, except the pendulous element B, and with the magnets de-magnetized, is suspended in the liquid and it remains in whatever position it is placed, then the center of gravity and the center of buoyancy coincide. The said adjustments and placing of weights are continued until such coincidence of the center of gravity and center of buoyancy are effected.

It is next necessary to cause the center of gravity and center of buoyancy of the magnetic element and cup 40 to coincide with the center of pivot 31. For this purpose, the sensitive element may be adjusted in two ways in the horizontal plane by means of pairs of screws 47, 47' having heads 48 abutting against member 34 in grooves 49 formed in the flanged portion 35 of said member. Two pairs of screws are shown in quadrature so that any desired adjustment in a horizontal plane along two axes at right angles to each other may be effected to cause coincidence of the center of pivot 31 with the center of gravity and center of buoyancy in the vertical axis through pivot 31. This is accomplished by loosening up on one screw of a pair and tightening the other screw of said pair. However, the said center of gravity and center of buoyancy may be above or below the center of pivot 31, and in order to make them coincide a vertical adjustment may be effected by screwing post 33 into or out of member 34. For this purpose, the said post may be provided with a toothed wheel 52 whereby said turning may be effected to raise or lower the float chamber 20 until the said center of gravity and center of buoyancy coincide with the center of pivot 31. Proof of coincidence is obtained when the sensitive element (exclusive of ball B but including support 40, and with the magnets de-magnetized) retains any position in which it may be placed on cup 30.

When such coincidence has been effected, the pendulous element B is placed in cup 40. The exact degree of pendulosity is thus known, and in the present case such pendulosity is of the very minimum amount. This amount may be stated as being just sufficient to overcome pivot friction of the sensitive element so that it may be maintained in a horizontal plane.

As thus far described, the sensitive element, consisting of the magnetic meridian-seeking element, the pendulous element, and the support therefor, constitutes a very slightly pendulous magnetic compass. The fact that the pendulosity of the sensitive element is very slight, being only sufficient to enable it to overcome pivot friction and maintain itself in a horizontal plane, will prevent any great errors from being introduced in response to acceleration forces, the said term "acceleration forces" being used here in its broadest sense to include change of speed in a straight line or turning in any direction. Furthermore, in addition to reducing the error due to pendulosity by making the pendulous factor the minimum essential quantity, such error in response to acceleration forces is further reduced by making the inertia of the sensitive element sufficient so that said element remains substantially unresponsive to all disturbing forces except those of long period. In effect, therefore, the large inertia of the sensitive element constitutes a damper on the forces which would ordinarily be introduced by the slight pendulosity of the sensitive element in response to short period disturbances.

The compass as thus far described has made provision for three important means for eliminating errors due to acceleration. These are as follows:

1. The magnets are free to take up their natural angle of dip and therefore no counterweighting is necessary and therefore no acceleration errors due to this gravitational unbalance are possible.
2. The pendulosity of the sensitive element has been reduced to such a minimum that there is only sufficient pendulosity to overcome the friction in the bearings, and therefore the errors due to such pendulosity are held to a minimum.

3. The inertia of the sensitive element has been made so great that the said element will not be substantially affected by short period disturbing forces.

Figure 5:
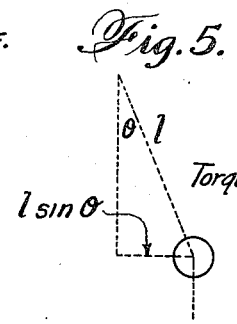
Figure 7:
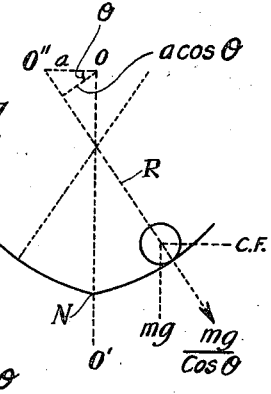
Figure 9:
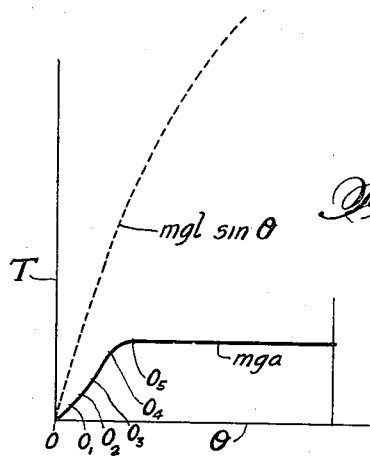
Figure 8:
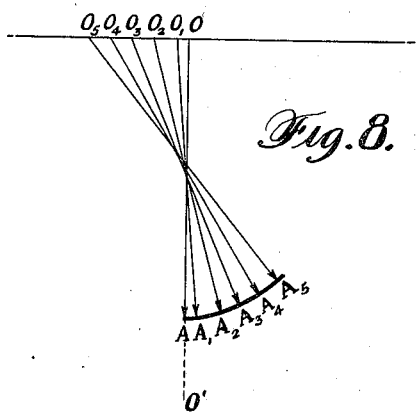

In spite of all the above steps to reduce the errors caused by acceleration forces, the fact remains that the sensitive element, being pendulous, although only slightly so, would normally respond to large acceleration forces, were it not for the fact that I make provision for eliminating the possibility of such errors. For this purpose, I provide a pendulous element which, instead of being rigidly connected to the magnetic element, is loosely coupled, that is, movably connected with the magnetic element. Further, I provide that the inner surface 60 of cup 40 is formed, not as a true sphere, but as a predetermined surface of revolution. The theory underlying the formation of the inner surface 60 of cup 40 may be explained as follows, taken in connection with the series of diagrams shown in the drawings. Referring first to Fig. 5, it is well known that if the pendulous element were fixed to the magnetic element it would follow the law of the simple pendulum. Thus, if the angle of displacement is $\theta$ the length of the pendulum $l$, and the weight of the ball indicated as $mg$, then the disturbing torque $= mgl \sin \theta$ and the greater the angle of displacement the greater is the disturbing torque, so that if plotted as a curve as shown in Fig. 9, a sine curve results. If, now, the pendulous element takes the form of a ball, as shown, and is permitted to ride upon a cup having a perfectly spherical surface, as shown in Fig. 6, the pendulous element exerts no torque on the cup because the resultant force always acts through the center O, no matter how far the ball is displaced. If the cup, instead of having a perfectly spherical inner surface, is formed by rotating it around axis O, O' (see Fig. 7) while the cutting tool is pivoted at O'' displaced from O by the distance $a$ at right angles to the axis O, O', and having a radius R, there results a cup which has a notch N in the extreme lowest point. When the acceleration force is sufficient to displace the ball from the notch, then the disturbing torque which the ball exercises on the cup is $$\frac{mg}{\cos \theta} \times a \cos \theta$$

and as a result the disturbing torque $= mga$. It now becomes apparent that the greater the distance $a$ the larger the disturbing torque which the pendulous element exercises on the cup. In this manner it will be seen that the inner surface 60 may be designed so that the disturbing torque increases as the angle of displacement of the pendulous element relative to the cup increases. If now we plot the disturbing torques which the pendulous element exerts upon the cup, as the angle of displacement increases, we find (see Fig. 9) that the curve begins at zero and reaches a maximum value when the center of the cutting tool reaches the maximum displacement $a$ at $O_5$ and thereafter remains constant because the distance $a$ does not increase. This surface may begin with zero displacement of the center, that is, with $a=0$, so that at the starting point, the surface 60 is a perfect circle drawn with radius OA. The next portion of surface 60 is drawn with center $O_1$ displaced a distance $a$ from O, and with radius $O_1A_1$. Each successive portion is drawn from centers $O_2$, $O_3$, etc., displaced increasing distances horizontally from O, and with increasing radii—$O_2A_2$, $O_3A_3$, etc. It will be understood that the surface designed in Fig. 8 is cut as a continuous cam, the cup rotating around axis O, O.'

The value of $a$ for any given angle of displacement of the pendulous element relative to the cup is chosen in the following manner: It has been shown that if the pendulous element were rigidly connected to the magnetic element, the disturbing torque which it would apply as the angle of displacement increased would be $mgl \sin \theta$, whereas in the case of the ball loosely coupled to the cup, that is, movable relative to the cup, the torque is $mga$. If now, the values of $a$ are so chosen that the values of $mga$ are for the respective angles of displacement less than $mgl \sin \theta$, then the disturbing torque which the ball B will exert on the cup will for the respective angles of displacement of the ball on the cup exert a smaller disturbing torque than would a pendulum rigidly connected to the magnetic element. That is to say, since both sides of the formula contain $mg$ it is only necessary to make $a$ less than $l \sin \theta$ for every value of $\theta$ up to the practical maximum value thereof, which is approximately 60°. In this manner, by suitably selecting the values of $a$ the disturbing torques which acceleration forces exert upon the magnetic element may be cut down to any desired small fraction of what it ordinarily would be if the pendulous element were rigidly coupled to the magnetic element.

In this manner, applicant has solved the problem of providing the necessary pendulosity to render a magnetic compass operative without laying the compass open to the substantial errors due to acceleration forces acting upon the pendulous factor, which errors have in the past been of such magnitude as to render the compass ineffective for the purpose of guiding the flight of a craft.

The usual airplane compass markings are placed on the outer surface of wall 21 of the card element and are read in conjunction with lubber line 142 supported by the casing back of window 39.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a device of the character described, a sensitive element, means for supporting said element for universal movement, said element comprising a direction-seeking magnetic element, a pendulous element, means whereby said pendulous element applies torques to said magnetic element, and means for substantially eliminating errors due to acceleration, said last-named means including a support for supporting said pendulous element on said magnetic element, said support being so formed that said pendulous element moves thereon relative to said magnetic element in response to all acceleration forces.

2. In a device of the character described, a sensitive element, means for supporting said element for universal movement, said element comprising a direction-seeking magnetic element, a pendulous element, means whereby said pendulous element applies torques to said magnetic element, and means for substantially eliminating errors due to acceleration, said last-named means including a cup-shaped support carried by said magnetic element, said pendulous element being adapted to be supported on the inner surface of said support, said inner surface being so formed as to permit movement of said pendulous element thereon in response to all acceleration forces.

3. In a device of the character described, a sensitive element, means for supporting said element for universal movement, said element comprising a direction-seeking magnetic element, a pendulous element, means whereby said pendulous element applies torques to said magnetic element, and means for substantially eliminating errors due to acceleration, said last-named means including a support for supporting said pendulous element on said magnetic element, said support having means whereby said pendulous element moves relative to said magnetic element in response to all acceleration forces and applies torques of lesser magnitude to said magnetic element than would be applied if said pendulous element were rigidly connected to said magnetic element.

4. In a device of the character described, a sensitive element, means for supporting said element for universal movement, said element comprising a direction-seeking magnetic element, a pendulous element, means whereby said pendulous element applies torques to said magnetic element, and means for substantially eliminating errors due to acceleration, said last-named means including a cup-shaped support carried by said magnetic element, said pendulous element being adapted to be supported on the inner surface of said support, said inner surface being so formed as to permit movement of said pendulous element thereon in response to all acceleration forces and cause said pendulous element to apply torques of lesser magnitude to said magnetic element than would be applied if said pendulous element were rigidly connected to said magnetic element.

5. In a device of the character described, a sensitive element, means for supporting said element for universal movement, said element comprising a direction-seeking magnetic element, a pendulous element, means whereby said pendulous element applies torques to said magnetic element, and means for substantially eliminating errors due to acceleration, said last-named means including a support for supporting said pendulous element on said magnetic element, said support having means whereby said pendulous element applies torques of lesser magnitude to said magnetic element than would be applied if said pendulous element were rigidly connected to said magnetic element.

6. In a device of the character described, a mass, means for supporting said mass for universal movement, a pendulous element, means whereby said pendulous element applies torques to said mass, and means for substantially eliminating errors due to acceleration, said last-named means including means whereby said pendulous element, in response to all acceleration forces, applies torques to said mass of lesser magnitude than would be applied if said pendulous element were rigidly connected to said mass.

7. In a device of the character described, a mass, means for supporting said mass for universal movement, a pendulous element, means whereby said pendulous element applies torques to said mass, and means for substantially eliminating errors due to acceleration, said last-named means including means for so supporting said pendulous element on said mass that said element, in response to all acceleration forces, applies torques to said mass of lesser magnitude than would be applied if said pendulous element were rigidly connected to said mass.

ELMER A. SPERRY, Jr.